US012710598B2

(12) United States Patent
Jutz

(10) Patent No.: US 12,710,598 B2
(45) Date of Patent: Aug. 18, 2026

(54) CABLE CONNECTOR ASSEMBLY

(71) Applicant: NEUTRIK AG

(72) Inventor: Bernhard Jutz, Rankweil (DE)

(73) Assignee: Neutrik AG, Schaan (LI)

(*) Notice: Subject to any disclaimer, the term of this patent is extended or adjusted under 35 U.S.C. 154(b) by 483 days.

(21) Appl. No.: 18/557,723

(22) PCT Filed: Apr. 28, 2022

(86) PCT No.: PCT/EP2022/061340
§ 371 (c)(1),
(2) Date: Oct. 27, 2023

(87) PCT Pub. No.: WO2022/243003
PCT Pub. Date: Nov. 24, 2022

(65) Prior Publication Data

US 2024/0241323 A1 Jul. 18, 2024

(30) Foreign Application Priority Data

May 21, 2021 (AT) ................................ A50403/2021

(51) Int. Cl.
*G02B 6/38* (2006.01)
*H01R 13/58* (2006.01)

(52) U.S. Cl.
CPC ......... *G02B 6/3817* (2013.01); *G02B 6/3878* (2013.01); *G02B 6/3894* (2013.01); *H01R 13/5825* (2013.01); *H01R 13/5837* (2013.01)

(58) Field of Classification Search
CPC .................................................... G02B 6/3894
See application file for complete search history.

(56) References Cited

U.S. PATENT DOCUMENTS

| | | | | |
|---|---|---|---|---|
| 4,563,049 | A | 1/1986 | Thibeault | |
| 4,632,488 | A | 12/1986 | Long et al. | |
| 6,403,884 | B1 * | 6/2002 | Lange | H01R 13/622 174/653 |

(Continued)

FOREIGN PATENT DOCUMENTS

| | | | | |
|---|---|---|---|---|
| CN | 109713515 | | 5/2019 | |
| CN | 110661138 | A * | 1/2020 | H01R 13/639 |

(Continued)

*Primary Examiner* — Chris H Chu
(74) *Attorney, Agent, or Firm* — Volpe Koenig

(57) ABSTRACT

A cable connector assembly for electrical and/or optical cables and for connection to a complementary connector assembly. A housing for receiving the contact elements can be connected to a clamping sleeve via a threaded connection. A partially radially compressible clamping member surrounds and grips the cable at the latest when the threaded connection of the clamping sleeve and the housing is tightened. A tightening sleeve, having a length less than the clamping sleeve, is pushed coaxially over at least a portion of the clamping sleeve. A unidirectional locking mechanism interposed between the clamping sleeve and the tightening sleeve prevents a relative rotation of the tightening sleeve and the clamping sleeve in the tightening direction of the threaded connection between the clamping sleeve and the housing beyond a certain extent. A user can assemble the cable connector assembly manually, but can no longer open it without a tool.

23 Claims, 11 Drawing Sheets

(56) References Cited

U.S. PATENT DOCUMENTS

| | | | | |
|---|---|---|---|---|
| 2006/0033218 | A1* | 2/2006 | Hafner | H01R 13/622 257/778 |
| 2017/0179638 | A1 | 6/2017 | Yu | |
| 2018/0366873 | A1 | 12/2018 | Menolotto et al. | |
| 2020/0284997 | A1* | 9/2020 | Zimmel | G02B 6/3859 |
| 2021/0098932 | A1* | 4/2021 | Zechmann | H01R 24/64 |

FOREIGN PATENT DOCUMENTS

| | | |
|---|---|---|
| DE | 202010011857 | 12/2010 |
| DE | 202016107070 | 2/2017 |

* cited by examiner 13
19
4
16
3
21
6
12
10
11
2
7
5
1
9
8
20

3
14
14
14
A
6

16
16a
15
15a
21
6
A
17
15b
21
15
3
21

CABLE CONNECTOR ASSEMBLY

CROSS-REFERENCE TO RELATED APPLICATIONS

This application is a 371 National Phase of International Application No. PCT/EP2022/061340, filed Apr. 28, 2022, which claims priority from Austrian Patent Application No. A50403, filed May 21, 2021, both of which are incorporated herein by reference as if fully set forth.

TECHNICAL FIELD

The invention relates to a cable connector assembly for electrical and/or optical cables.

BACKGROUND

In the field of entertainment electronics, stage technology and transmission of optical and acoustic signals and the supply of consumers in these fields with electrical current, high demands are made on the components which are used. This relates, on the one hand, to the robustness, protection of plug connections against dust, moisture and undesirable separation, and also safety.

Cable connector assemblies for use with electrical and/or optical cables with regard to both data and power supply often have a modular structure. They typically comprise a housing for receiving and for protecting the contact elements for electrical and/or optical contacting of a complementary connector assembly. A clamping member which can be at least partially pressed together radially engages around and clamps the cable. A clamping sleeve can be screwed on the rear end of the housing, as a result of the action of which all mentioned components of the cable connector assembly and the cable are clamped together. Consequently, a tension relief for the cable is brought about.

The clamping member for clamping the cable in the cable connector assembly is typically provided with at least one portion which can be radially pressed together and which engages round the cable and clamps the cable in the pressed-together state and a front edge region for abutment against a housing of the cable connector assembly and/or a connector continuation which can be inserted therein. The rear portion is in this instance mostly formed by a number of clamping tongues which are distributed along the circumference and which can preferably be resiliently pressed together in a radial direction.

U.S. Pat. No. 4,632,488 A sets out an electrical plug connector with tension relief and integrated means for clamping and manually releasing an electric cable. An arrangement of locking teeth is arranged behind the front portion and is arranged in a circumferential direction around an inner wall portion. An inner wall portion of the housing which is arranged between the arrangement of locking teeth and a rear entry opening of the housing has a circumferential groove which is formed therein. An element which is inserted into the housing has a cable clamping member which is connected in an integral manner to a tension relief by means of a bushing. The bushing has a locking pawl which can be brought into engagement with the arrangement of locking teeth.

CN 109713515 B sets out an electrical plug connector which is provided with a rotation limitation so that damage to the cable as a result of an excessive torsion angle caused by traction is effectively prevented. The arrangement provides a dual radial sealing structure between relatively rotating fitting surfaces and a dynamic and static ratchet wheel structure. A rib groove structure of the ratchet wheel arrangement and the associated portion may prevent a locking failure which is caused by environmental factors, mechanical vibration and impact environment.

DE 202016107070 U1 discloses a water-tight electrical connector having a housing, a clamping sleeve and a sleeve. Saw-tooth-like formations are present on the housing and on the clamping sleeve. The clamping sleeve receives the threaded cable and one of the ends thereof is docked on a stop sleeve, wherein the clamping sleeve is formed with a locking groove in order to receive an engaging locking projection. The sleeve which is connected to a metal bushing receives the clamping sleeve and the threaded cable in order to clamp the clamping sleeve or the cable. However, there is no need for a tightening sleeve and an engagement with a locking mechanism.

There is now increasingly a requirement that cable connector assemblies which are constructed in this manner after assembly must no longer be subsequently disassembled manually, that is to say, without the use of tools. In the known cable connector assemblies with the structure set out above, however, this is possible by the clamping sleeve simply being unscrewed manually in the opening direction of the threaded connection.

SUMMARY

An object of the present invention was to overcome the disadvantages of the prior art and to provide an apparatus by means of which a user can manually disassemble the cable connector assembly but can then no longer open it without the use of tools. In this instance, the cable connector assembly should in particular be suitable for being able to cover cables with different properties, specifically a large diameter range of cables.

This object is achieved with an apparatus with one or more of the features described herein. Other features can be derived from the description and the drawings.

The apparatus according to the invention for achieving the above object is characterized by a tightening sleeve, the length of which is smaller than that of the clamping sleeve and which is pushed coaxially over at least a part-portion of the clamping sleeve and a unidirectional locking mechanism between the clamping sleeve and tightening sleeve which prevents a relative rotation of the tightening sleeve and clamping sleeve in the tightening direction of the threaded connection between the clamping sleeve and housing beyond a specific degree. Consequently, with a manual rotation of the tightening sleeve in accordance with a specific circumferential play, the locking mechanism moves into engagement and with further rotation of the tightening sleeve the clamping sleeve which is located below is carried and rotated in order to produce the threaded connection with the thread of the housing. At most, in a similar manner to a ratchet arrangement, the tightening sleeve can be rotated back and forth multiple times always in the same angular range in order to tighten the threaded connection, which even further facilitates the assembly of the cable connector assembly. When the tightening sleeve is rotated in the opposite direction, however, the locking mechanism does not engage and the tightening sleeve turns without effect without acting on the threaded connection in the opening rotation direction.

Preferably, in this instance, the apparatus with a well-established and operationally reliable structure is characterized by a dimensionally accurate locking mechanism or toothed locking mechanism between the clamping sleeve and tightening sleeve, wherein on either the tightening sleeve or the clamping sleeve a slotted member having at least one long, flat flank and at least one steep flank which faces in the opening direction of the threaded connection between the clamping sleeve and housing is formed and on the other component a locking pawl having a substantially complementary shape is formed.

A preferred embodiment of the invention makes provision for the height of the slotted member and the locking pawl to change in a direction parallel with the rotation axis of the clamping sleeve and tightening sleeve. This permits a structure of the arrangement of the clamping sleeve and tightening sleeve which has a minimal dimension in a radial direction.

An advantageous embodiment of the invention is further characterized in that the length of the locking pawl is only a fraction of the length of the slotted member. A preferred variant makes provision for the length of the locking pawl to have a maximum of 10% of the length of the slotted member.

Particularly advantageous in terms of technical production is an embodiment in which the slotted member is formed on the clamping sleeve and the locking pawl is formed on the tightening sleeve.

However, since it is sometimes necessary to take apart the cable connector assembly which is secured against being unscrewed manually and to permit this using a tool, another feature of the invention involves the rear edge of the clamping sleeve opposite the thread protruding beyond the rear edge of the tightening sleeve and having carrier locations for a tool in order to apply a torque to the clamping sleeve.

Particularly advantageous in this instance is an embodiment of the invention in which the carrier locations are formed by at least a pair of planar faces which are arranged parallel with each other and which are arranged opposite each other with respect to the longitudinal center axis of the clamping sleeve. Then, using an open-end wrench or similar tools a torque can be applied to the clamping sleeve either in order to be able to release the threaded connection at all and to be able to disassemble the cable connector assembly or also in order to be able to tighten the threaded connection with a precisely defined torque without any risk of damaging the locking mechanism and the corresponding components.

Particularly preferred in this instance is an embodiment in which the width of the planar faces in the direction of the longitudinal center axis is between 1 mm and 10 mm. Preferably, a width between 3 mm and 6 mm is selected. Consequently, a secure placement of the tool and an adequate contact face for applying the required torque is ensured.

Another advantageous embodiment of the invention is characterized by a stop which limits the displaceability of the tightening sleeve with respect to the rear edge of the clamping sleeve. Consequently, it is ensured that the tightening sleeve cannot slide down from the clamping sleeve or can be unintentionally pushed down.

A structurally simple-to-produce specific embodiment of such a securing member to prevent removal of the tightening sleeve is produced according to the invention by a projection, which extends at least over a portion of the circumference, of the rear edge of the clamping sleeve, wherein the radial extent of the projection is greater than the inner diameter of a rear opening of the tightening sleeve.

In this instance, an embodiment is preferred in which the radial extent of the circumferential projection decreases toward the rear end. This facilitates the assembly of the cable connector assembly by the tightening sleeve being pushed from the rear onto the clamping sleeve and with slight resilient expansion of the rear edge region thereof being able to be pushed over the edge region of the clamping sleeve.

In order to compensate for play between the clamping sleeve and the tightening sleeve, an advantageous embodiment of a cable connector assembly according to the invention is characterized by at least one projection on the outer side of the clamping sleeve, which projection at least for the most part bridges the intermediate space between the clamping sleeve and tightening sleeve. Consequently, during movements of the cable connector, as may occur, for example, when used as a loudspeaker connector as a result of the vibrations which occur, the occurrences of the clamping sleeve and tightening sleeve striking each other are reduced. Preferably, the projections bridge the intermediate space between the two coaxial sleeves completely, whereby a clattering or rattling is also prevented completely.

In order to prevent undesirable disengagement of the threaded connection between the clamping sleeve and housing in the event of vibrations of the cable connector assembly, another advantageous embodiment of the invention is characterized by a unidirectional locking mechanism between the clamping sleeve and clamping member. This is configured in such a manner that it prevents a relative rotation of the clamping sleeve and clamping member in an opening direction of the threaded connection between the clamping sleeve and housing.

A preferred embodiment provides in addition a dimensionally accurate locking mechanism or toothed locking mechanism between the clamping sleeve and tightening sleeve, wherein either on the tightening sleeve or on the clamping sleeve at least one catch and on the other component at least one locking pawl are formed.

Particularly advantageous with respect to the force distribution and consequently the mechanical stability is an embodiment according to the invention having a plurality of, preferably three, saw-tooth-like locking pawls which are distributed in a uniform manner over the circumference and which have short flanks which face in the opening direction of the threaded connection between the clamping sleeve and housing.

Another contribution to achieving the objective set out in the introduction is a clamping member which is characterized by a plurality of, preferably two, different types of clamping tongues. This then leads to different properties of the different groups of clamping tongues in order to thereby be able to securely clamp a large number of different cable types. This clamping member can advantageously be used in a cable connector assembly, as previously described above, but can also be used alone in other and also conventional cable connector assemblies.

An embodiment is preferred in this instance in which each clamping tongue of a first group of clamping tongues is wider than the clamping tongues of a second group.

Another embodiment according to the invention is characterized in that the first clamping tongues widen with increasing spacing from the front edge of the clamping member. Preferably, these clamping tongues are chamfered at the side edges thereof. This enables additional clamping tongues which may potentially be arranged therebetween to be pressed together even further radially inward and consequently to increase the effect of the diameter reduction or the clamping action.

Preferably, in order to improve the clamping action, the first clamping tongues have at the end thereof a portion which is constructed to apply a clamping action to a cable for positive-locking introduction into the cover of the cable.

Another embodiment of the clamping member according to the invention makes provision for the clamping tongues of a second group of clamping tongues to be configured to be slightly narrower, whereby the resilient deflection is facilitated and the radial pressing together is easier or possible to a greater extent.

In this instance, there is preferably provision for the side edges of the clamping tongues of the second group to preferably extend parallel with each other over the entire length.

Preferably, in order to improve the clamping action of the clamping tongues of the second group, a region which is configured to increase the retention action on the cable extends from the outer end of the clamping tongues almost as far as the inner end thereof.

In order to be able to cover a large diameter range of cables with the clamping member according to the invention, according to a preferred embodiment of the invention the clamping member is characterized in that, in the case of clamping tongues which extend in alignment with the front edge region, the clear width between the ends of the clamping tongues is between 70 and 95% of the diameter of the clamping member and, in the case of clamping tongues which are compressed to the maximum extent, wherein the first clamping tongues are in mutual abutment, the clear width between the ends of the clamping tongues, preferably between the clamping tongues of the second group, is between 10 and 40% of the diameter of the clamping member.

BRIEF DESCRIPTION OF THE DRAWINGS

For better understanding of the invention, this is explained in greater detail with reference to the following Figures.

In a highly simplified schematic illustration.

DETAILED DESCRIPTION

Figure 1:
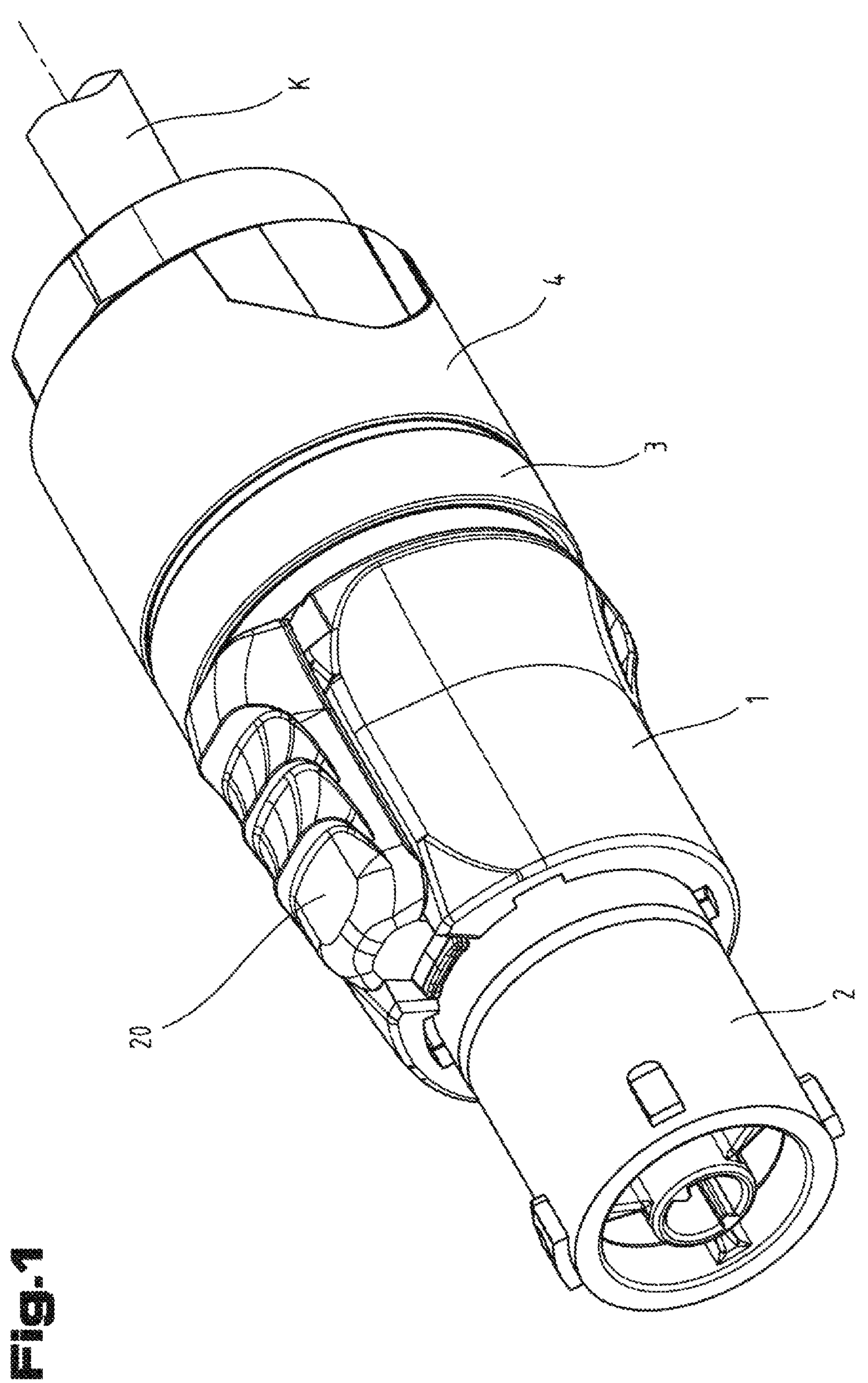
FIG. 1 shows a perspective view of a first embodiment of a cable connector assembly according to the invention.

Initially, it should be set out that in the differently described embodiments the same components are given the same reference numerals or provided with the same component names, wherein the disclosures contained in the entire description can be transferred accordingly to the same components with the same reference numerals or the same component names. The position indications selected in the description, such as, for example, top, bottom, side, etcetera, also refer to the directly described and illustrated Figure and these position indications are accordingly intended to be transferred to the new position during a position change.

FIG. 1 shows by way of example a specific embodiment of a cable connector assembly according to the invention for connecting to a complementary connector assembly, as typically used for power cables or loudspeaker cables in the field of stage technology and event technology. The same or similar assemblies are possible for all types of electrical and/or optical cables.

A connector continuation 2 protrudes forward out of a housing 1 on a complementary plug connector which is not illustrated in this instance. Within the connector continuation 2, the contact elements (not illustrated) for electrical and/or optical contacting of a complementary connector assembly, for example, a chassis bushing, are arranged in a protected state. The housing 1 preferably carries an unlocking slotted member 20 for releasing a locking, which is preferably provided, to the complementary plug connector. The rear portion of the cable plug assembly is formed by an assembly comprising a clamping sleeve 3 and a tightening sleeve 4 which is pushed on coaxially relative thereto. The cable K emerges at the rear end of the cable plug assembly.

Figure 2:
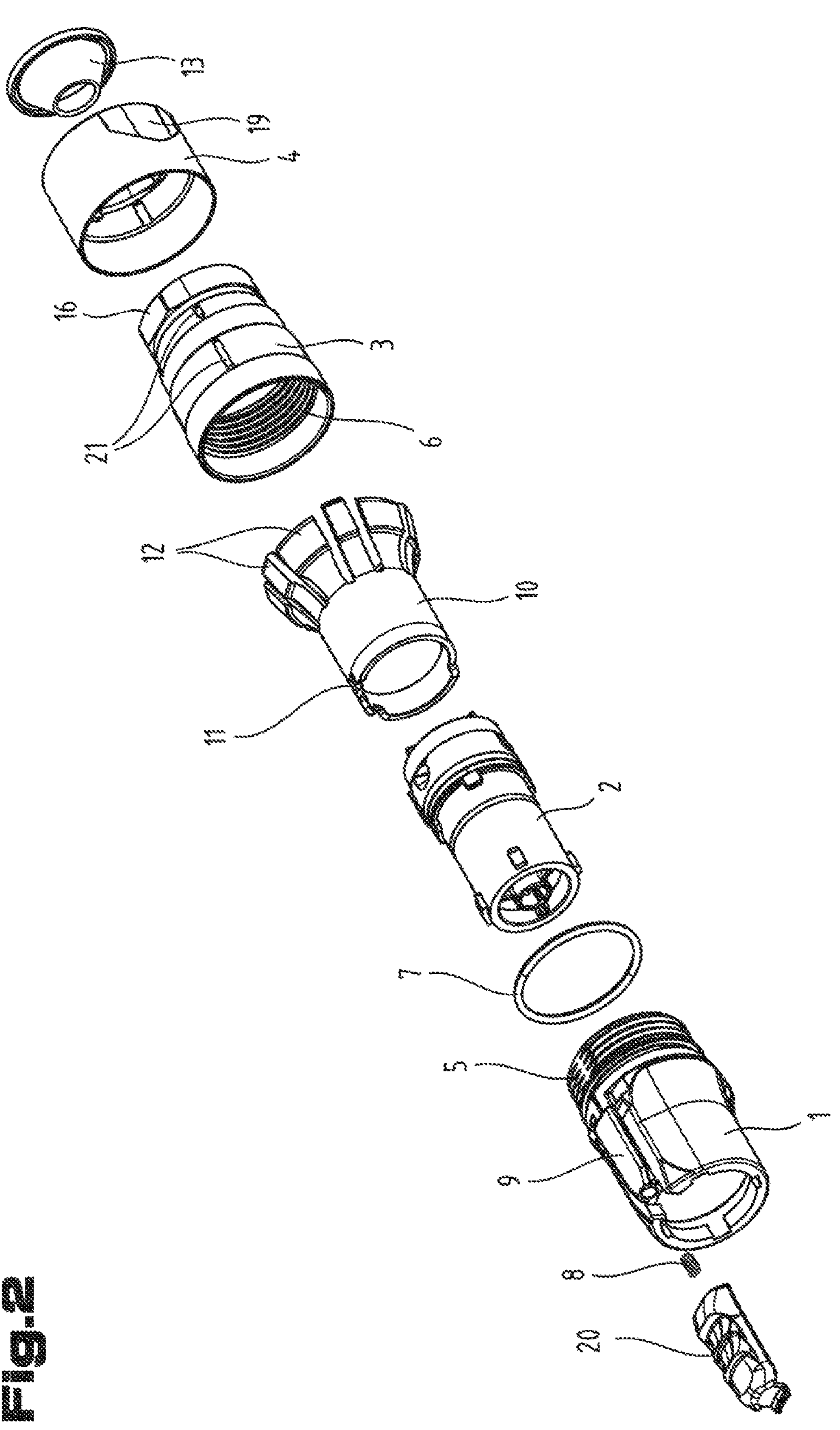
FIG. 2 shows an exploded illustration of the cable connector assembly of FIG. 1.

As can be seen in the exploded view of FIG. 2, the connector continuation 2 is typically inserted into the housing from the rear. However, it could also be an integral component of the housing 1, which has on the rear edge, for example, an outer thread 5 in order to produce a threaded connection with an inner thread 6 in the front region of the clamping sleeve 3. Instead of a threaded connection, other types of connection may also be provided between the housing 1 and clamping sleeve 3 which provide a rotation of the two components relative to each other, for example, a connection by means of a bayonet closure. A sealing ring 7 may be inserted between the housing 1 and connector continuation 2. A resilient element 8 ensures the return of the unlocking slotted member 20, which can be displaced on a web 9 on the housing 1 in the longitudinal direction thereof.

The cable connector assembly according to the invention typically further comprises a clamping member 10, often also referred to as a collet chuck. The clamping member 10 is pushed onto the cable K, either in the longitudinal cable direction or, if a longitudinal slot is present, along the entire length of the clamping member also from a radial direction and abuts with the front edge region 11 thereof against the housing 1 and/or the connector continuation 2 which has been inserted therein, at most also on one or more of the contact elements which are inserted in the connector continuation 2 and/or the housing 1. The rear portion of the clamping member 10 is formed by a number of clamping tongues 12 which are distributed along the circumference and which can preferably be resiliently pressed together in a radial direction in order to clamp the cable K which extends through therebetween. The radial compression of the clamping tongues 12 is carried out when the clamping sleeve 3 is pushed on and when the threaded connection is produced between the housing 1 and clamping sleeve 3. In this instance, all the mentioned components of the cable connector assembly and the cable are clamped to each other so that a precise positioning of the components and a tension relief for the cable K are produced.

At the rear end of the cable connector assembly, in the opening provided for the cable K there is preferably arranged in the region of the rear edge of the clamping sleeve 3 a sealing collar 13 through which the cable K emerges from the cable connector assembly. In place of the sealing collar 13, a bend protection or a component which links both functions may also be inserted.

Figures 3, 4:
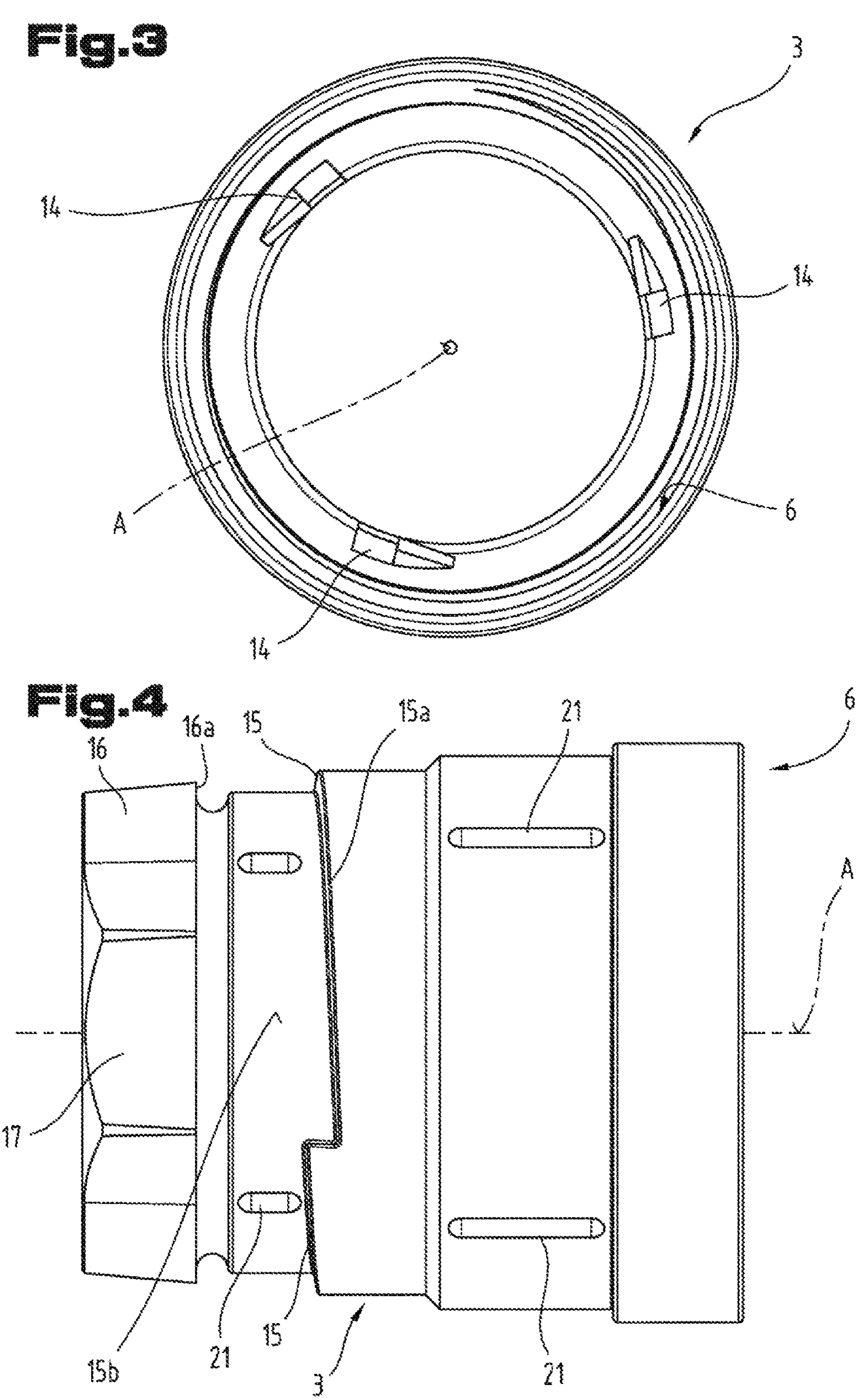
FIG. 3 shows a view from the front of a clamping sleeve according to the invention for use in a cable connector assembly.
FIG. 4 shows a side view of the clamping sleeve of FIG. 3.

FIG. 3 shows a view of the clamping sleeve 3 when viewed from the direction of the housing 1. In this instance, it can be seen that at least the inner diameter from the front edge of the clamping sleeve 3, on which the thread 6 is arranged, to the opposing rear end preferably decreases in a conical or gradually stepped manner. Consequently, inter alia, when the threaded connection to the housing 1 is tightened, with the clamping sleeve 4 moving axially in the direction toward the housing 1, the clamping member 10, in particular the clamping tongues 12, are caused to be radially compressed and the entire clamping member 10 is also caused to be pressed forward in the direction toward the housing 1 in order to clamp the cable K inside the clamping member.

In the longitudinal portion of the clamping sleeve 3 which comes to rest in the region of the clamping tongues 12 when the housing 1 and clamping sleeve 3 are screwed together, there are arranged three locking pawls 14 which are part of a dimensionally accurate locking mechanism or toothed locking mechanism between the clamping sleeve 3 and the clamping member 10. Preferably, three such locking pawls 14 or similar radially inwardly facing projections are provided on the inner side of the clamping sleeve 3, preferably in a state distributed in a uniform manner over the circumference. They have, when viewed in a circumferential direction, a saw-tooth-like shape, wherein the short flanks thereof face in the opening direction of the threaded connection between the clamping sleeve 3 and housing 1. The lateral edges of the clamping tongues 12 of the clamping member 10 form in each case a catch on which the locking pawls 14 can be supported with the short flanks thereof, and consequently constitute the corresponding portion of the unidirectional locking mechanism between the clamping sleeve 3 and clamping member 10, which prevents a relative rotation of the clamping sleeve 3 and clamping member 10 in the opening direction of the threaded connection between the clamping sleeve 3 and housing 1 and consequently constitutes a securing member of this threaded connection to prevent unintentional loosening. In the opposite direction, with the use of force, the locking pawl 14 with a long flank, when viewed relative to the short flanks which are supported on the clamping tongues 12, can be pressed over the edges of the clamping tongues 12 and the threaded connection can thus be tightened. The positioning of locking pawls and catches on the clamping sleeve and clamping member could also be selected to be transposed as described above.

Figure 5:
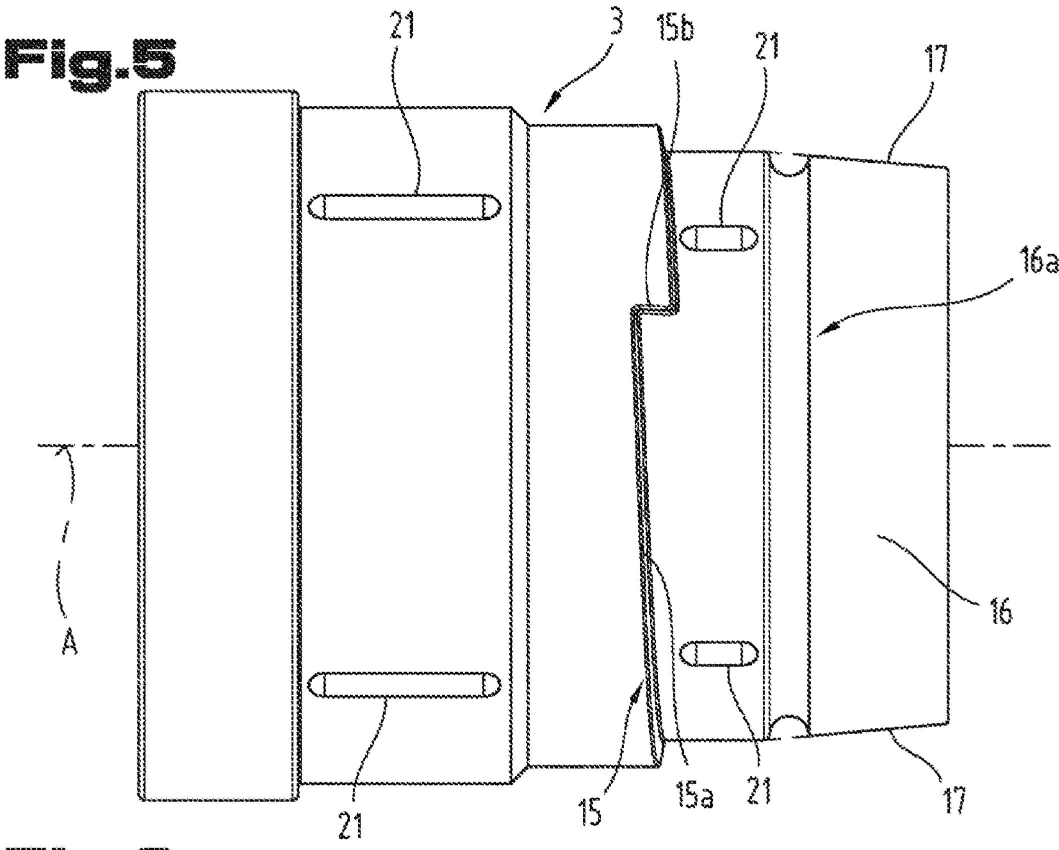
FIG. 5 shows a side view of the clamping sleeve of FIG. 3 from an orthogonal direction.

In the side views of the clamping sleeve 3 according to the invention in FIG. 4 and FIG. 5, an outer diameter which externally becomes smaller in a stepped manner from the front edge with the inner thread 6 toward the rear edge can be seen. In the central longitudinal portion there is formed a circumferential slotted member 15 which is slightly chamfered in a circumferential direction and which extends with at least one long, flat flank **15*a* and at least one steep flank 15*b* which faces in the opening direction of the threaded connection between the clamping sleeve 3 and housing 1 around the clamping sleeve 3**.

On the rear edge of the clamping sleeve 3, a projection 16, which extends at least over a portion of the circumference, of the rear edge of the clamping sleeve 3 is provided. The radial extent of this projection 16 is at least at some locations along the circumference, preferably over the entire circumference of the clamping sleeve 3, greater than the inner diameter of a rear opening of the tightening sleeve 4 and consequently retains it in the coaxial pushed-on position on the clamping sleeve 3 and ensures that the tightening sleeve 4 cannot unintentionally slide backward from the clamping sleeve 3 or be removed. The projection 16 forms for the tightening sleeve 4 a rear, limiting stop **16*a***.

In this case, however, the projection 16 is configured in such a manner that the radial extent decreases in the direction toward the rear end of the clamping sleeve 3 and consequently makes it easier for the tightening sleeve 4 to be pushed onto the clamping sleeve 3, wherein at least the rear edge region of the tightening sleeve preferably resiliently slightly expands.

On the projection 16 at the rear portion, which protrudes beyond the tightening sleeve 4, of the clamping sleeve, there is arranged at least one carrier location 17 for a tool, the dimensions of which are too small for manual gripping or application of forces which enable a relative rotation of the clamping sleeve 3 with respect to the housing 1 in order to release the threaded connection. However, using this tool which is placed at the carrier location 17 and which can be moved in a circumferential direction, an adequate torque can be applied to the clamping sleeve 3, even when this, as a result of the dimensions of the projection 16, may not be possible in a purely manual manner. Preferably, at least two carrier locations 17 in the form of at least a pair of planar faces which are located in the longitudinal direction parallel with the center plane of the clamping sleeve 3 are formed and are arranged parallel with each other and opposite each other with respect to the longitudinal center axis A of the clamping sleeve 3. Typically, the planar faces have in the direction of the longitudinal center axis a width between 1 mm and 10 mm, preferably a width between 3 mm and 6 mm is selected so that, for example, an open-end spanner or similarly configured tool can be placed thereon.

FIG. 7 to FIG. 10 show the tightening sleeve 4 which has been pushed on coaxially over the clamping sleeve 3 according to the invention. The length thereof is smaller than that of the clamping sleeve 3 and it therefore covers coaxially and in the longitudinal direction a part-portion of the length of the clamping sleeve 3. Between the clamping sleeve 3 and tightening sleeve 4, in order to be able to bring about the tightening of the threaded connection between the clamping sleeve 3 and housing 1 via the tightening sleeve 4, a unidirectional locking mechanism is provided. This prevents a relative rotation of the tightening sleeve 4 and clamping sleeve 3 in the tightening direction of the threaded connection beyond a specific degree or circumferential play and, after this play has been overcome and in the engagement state of the locking mechanism when the tightening sleeve 4 has been rotated further, enables the clamping sleeve 3 located below to be carried in order then with further rotation to tighten the threaded connection between the clamping sleeve 3 and housing 1 or to bring about any other connection in which the clamping sleeve 3 and housing 1 have to be rotated relative to each other.

A dimensionally accurate locking mechanism or toothed locking mechanism is advantageously also used between the clamping sleeve 4 and tightening sleeve 4. In this instance, with the above-described slotted member 15 of the clamping sleeve in the locking direction, at least one locking pawl 18 of the tightening sleeve 4—which can be seen in FIG. 9 and FIG. 10—moves into engagement with a shape which is configured to substantially complement the slotted member 15. Preferably, the length of the or each locking pawl 18 is only a fraction of the length of the slotted member 15 and the locking pawls 18 in the rear longitudinal portion closer to the rear opening O are distributed in a uniform manner over the circumference of the tightening sleeve 4. A preferred variant makes provision for the length of the locking pawl 18 to be a maximum of 10% of the length of the slotted member 15, in particular the longer, flat flank 15*a* thereof. Although it is also in most cases advantageous in technical production terms to form the slotted member 15 on the clamping sleeve 3 and to provide the locking pawls 18 on the tightening sleeve 4, this arrangement could also be transposed.

Figure 6:
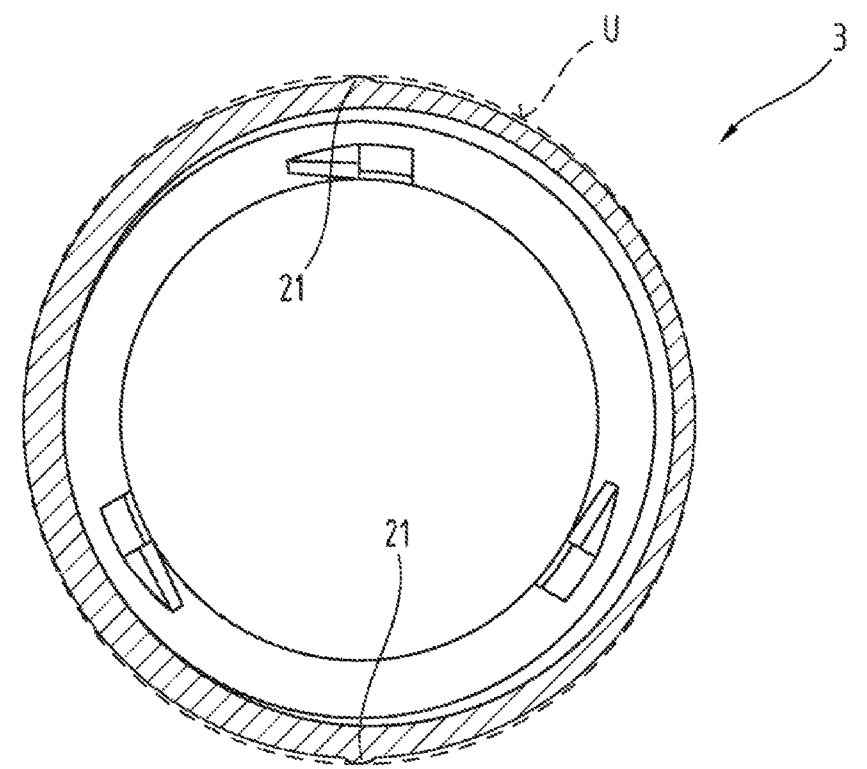
FIG. 6 shows a cross section through another embodiment of a clamping sleeve at the height of the projections.
Figure 7:
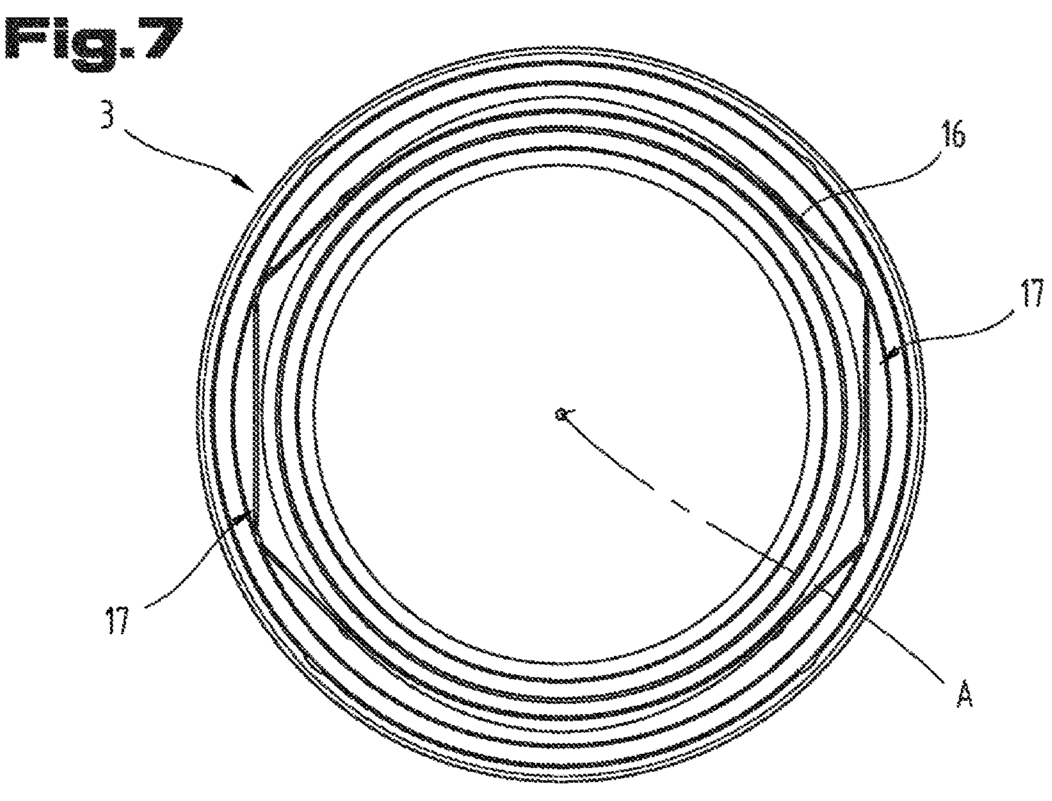
FIG. 7 shows a view from the rear of the clamping sleeve of FIG. 3.
Figure 8:
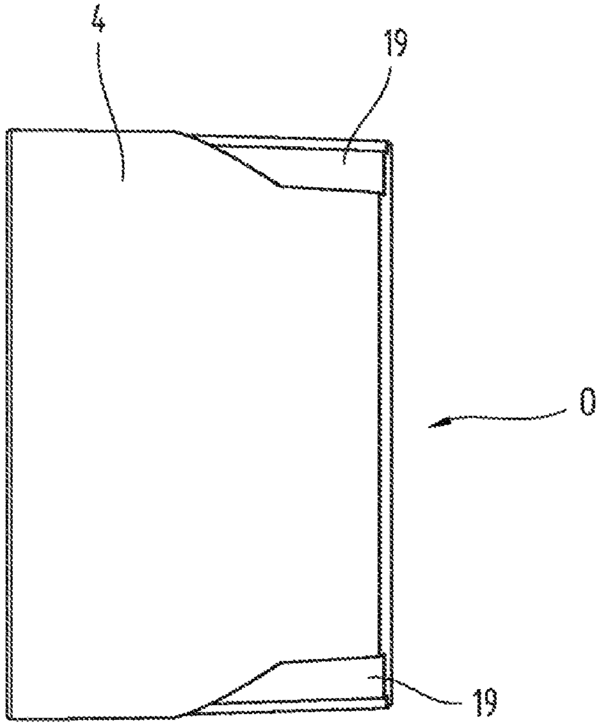
FIG. 8 shows a side view of a tightening sleeve according to the invention for use in a cable connector assembly.
Figure 9:
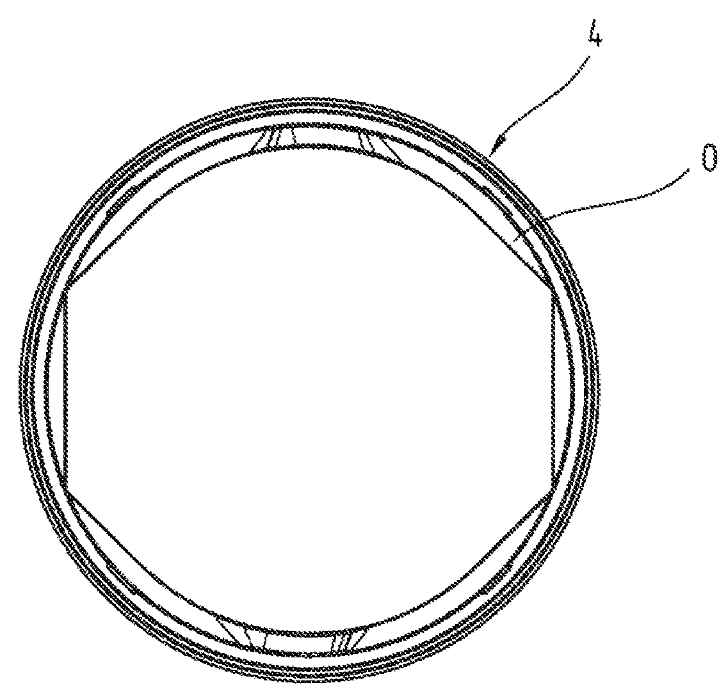
FIG. 9 shows a view of the tightening sleeve of FIG. 7 from the front.
Figure 10:
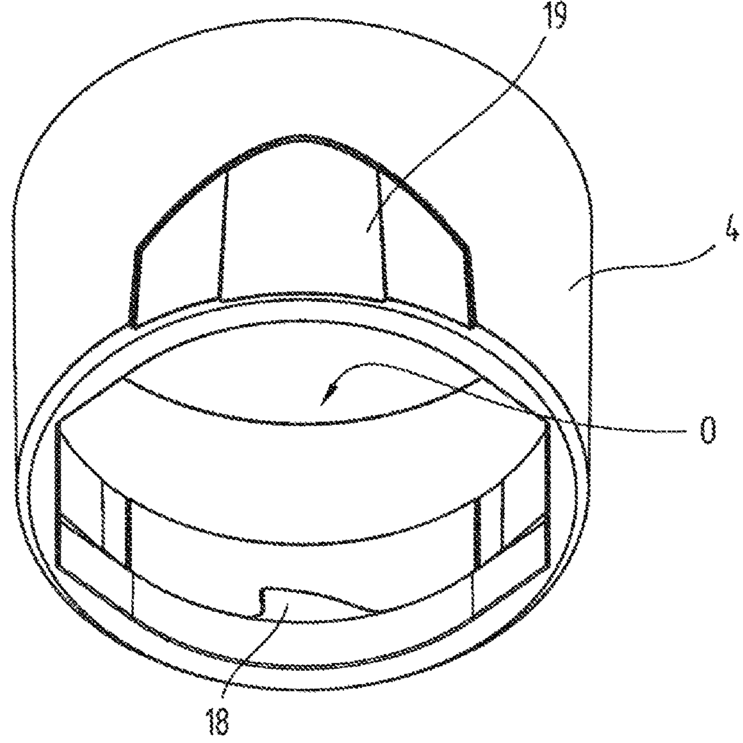
FIG. 10 shows a perspective view of the tightening sleeve of FIG. 7.

As can be clearly seen from a comparison of FIG. 6 with FIG. 8, the cross-sectional shape of the rear opening O of the tightening sleeve 4 substantially corresponds to the cross-sectional shape of the rear end of the clamping sleeve 3, in particular the shape of the projection 16 or the stop 16*a*. However, all the radial spacings for the tightening sleeve 4 are slightly smaller than those of the clamping sleeve 3, in particular of the stop 16*a* thereof, so that the cross-sectional surface-area of the rear opening O of the tightening sleeve 4 is therefore slightly smaller than the cross-sectional surface-area of the rear end of the clamping sleeve 3 or the projection 16 or the stop 16*a* thereof.

On the outer surface of the tightening sleeve 4 at the circumferential positions of the locking pawls 18—or, if the slotted member 15 is provided on the inner side of the tightening sleeve 4, at the locations of the steep flanks 15*b*—there are provided gripping faces 19 which ensure better handling of the tightening sleeve 4 as a result of material and/or structuring. Furthermore, they show the user the position of the locking pawls 18 or the corresponding portions of the slotted member 15 which during handling is advantageously intended to be radially compressed in order to prevent a slipping or skipping of the locking pawl 18 or the steep flank 15*b* and thus to securely carry the clamping sleeve 3 below when the tightening sleeve 4 is rotated.

In order to assemble the cable connector assembly according to the invention, the tightening sleeve 4 is advantageously gripped at the gripping faces 19 and rotated in the tightening direction of the threaded connection between the threads 5 and 6 of the housing 1 and the clamping sleeve 3. At most, after overcoming the play or a circumferential spacing between the steep flank 15*b* of the slotted member 15 and the locking pawl 18 of the opposing components housing 1 and clamping sleeve 3, the locking pawl 18 stops against the steep flank 15*b* and, when rotated further in a consistent rotation direction, the clamping sleeve 1 is carried by the tightening sleeve 4 and the threaded connection between the clamping sleeve 3 and housing 1 is tightened. At most, in a similar manner to a ratchet arrangement, the tightening sleeve 4 can be rotated several times back and forth always in the same angular range, whilst the clamping sleeve 3 below is always rotated further in order to tighten the threaded connection, which further facilitates the assembly of the cable connector assembly.

When the tightening sleeve 4 is rotated in the opposite direction, in the circumferential direction in order to release the threaded connection between the housing 1 and clamping sleeve 3, however, the locking mechanism explained above does not engage and the tightening sleeve 4 turns without any effect without acting on the threaded connection in the opening rotation direction. The locking pawl 18, for example, the tightening sleeve 4, slides in this instance along the flat, long flank 15*a* of the slotted member without applying sufficient torque to the clamping sleeve 1 to release the threaded connection or any other connection in the circumferential direction. The tightening sleeve 4 is in this instance only displaced slightly toward the rear in the direction of the longitudinal axis A of the clamping sleeve 3 until the end of the flank 15*a* is reached and the locking pawl 18 slides down on the steep flank 15*b* and the tightening sleeve 4 can slide forward as a whole again.

A preferred embodiment of the invention has as a play compensation between the clamping sleeve 3 and the tightening sleeve 4 at least one projection 21 on the outer side of the clamping sleeve 3, which projection 21 at least for the most part bridges the intermediate space between the clamping sleeve 3 and tightening sleeve 4. Preferably, the projections 21 which are constructed as relatively short or long webs, and preferably in a state orientated in the longitudinal direction of the clamping sleeve 3, completely bridge the intermediate space between the two coaxial sleeves 3, 4. The projections 21 which may also be present in other forms, for example, in the form of studs or small, circular webs, could also be arranged on the inner side of the tightening sleeve 4. A positioning of the projections 21 on both components 3, 4 is also possible as long as the groups on the mutually opposing sleeves 3, 4 are spaced apart from each other in an axial direction in order not to impede the relative movement of the tightening sleeve 4 and clamping sleeve 3. Preferably, two projections 21 are arranged on the clamping sleeve 3 and from a geometric and functional viewpoint form a surrounding outer contour U with a substantially elliptical form (see FIG. 6). The tightening sleeve 4 with a circular inner contour is pushed onto this elliptical clamping sleeve 3 and can be rotated on the clamping sleeve 3 without play.

Figure 11:
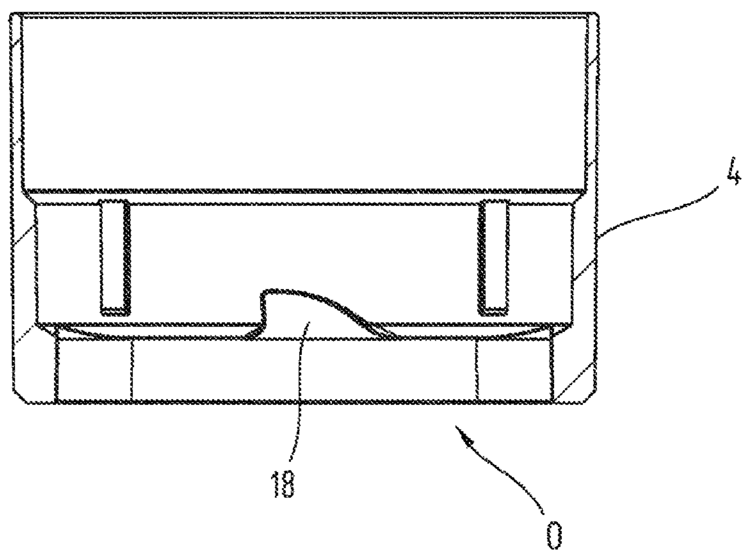
FIG. 11 shows a longitudinal section though the tightening sleeve of FIG. 7.

The clamping member 10 which is particularly advantageous for the cable connector assembly according to the invention, but which is also advantageous in other types of plug connectors is illustrated in FIG. 11 in the starting position thereof as a view of the clamping tongues 12 from the rear. This clamping member 10 has the advantage that it can be used for cables K in a very large diameter range.

It preferably has two different types of clamping tongues 12. Each clamping tongue 12*a* of a first group of clamping tongues 12 is wider than the clamping tongues 12*b* of the second group. The first clamping tongues 12*a* widen as the spacing from the front edge 11 of the clamping member becomes greater and are chamfered at the side edges thereof. They typically have mainly at the outermost end a portion which can apply a significant clamping action to the cable K or which can be introduced into the cable cover in a positive-locking manner or deform it.

The clamping tongues 12*b* of the second group are configured to be slightly narrower and the edges thereof are typically parallel with each other over the entire length of the clamping tongues 12*b*. A region which has transverse ribs or which is configured with a simar structuring to increase the retention effect on the cable K and which, by increasing the friction or by means of a positive-locking at least partial penetration into the cable cover, ensures a high level of clamping action, extends from the outer end of the clamping tongues 12*b* of the second group almost as far as the inner end.

Figure 12:
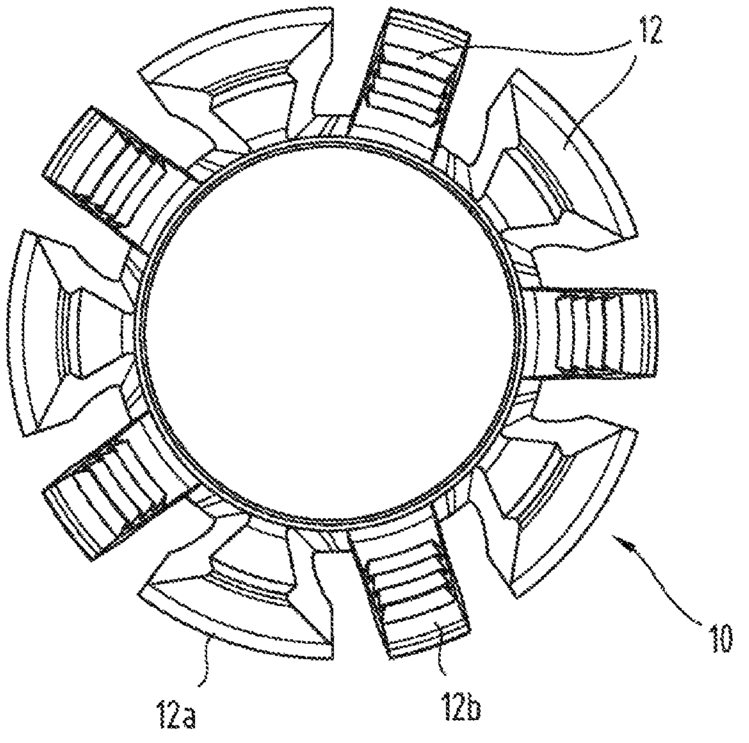
FIG. 12 shows a view from the rear of a clamping member according to the invention for use in a cable connector assembly in its state with the largest inner diameter, prior to insertion into the cable connector assembly.
Figure 13:
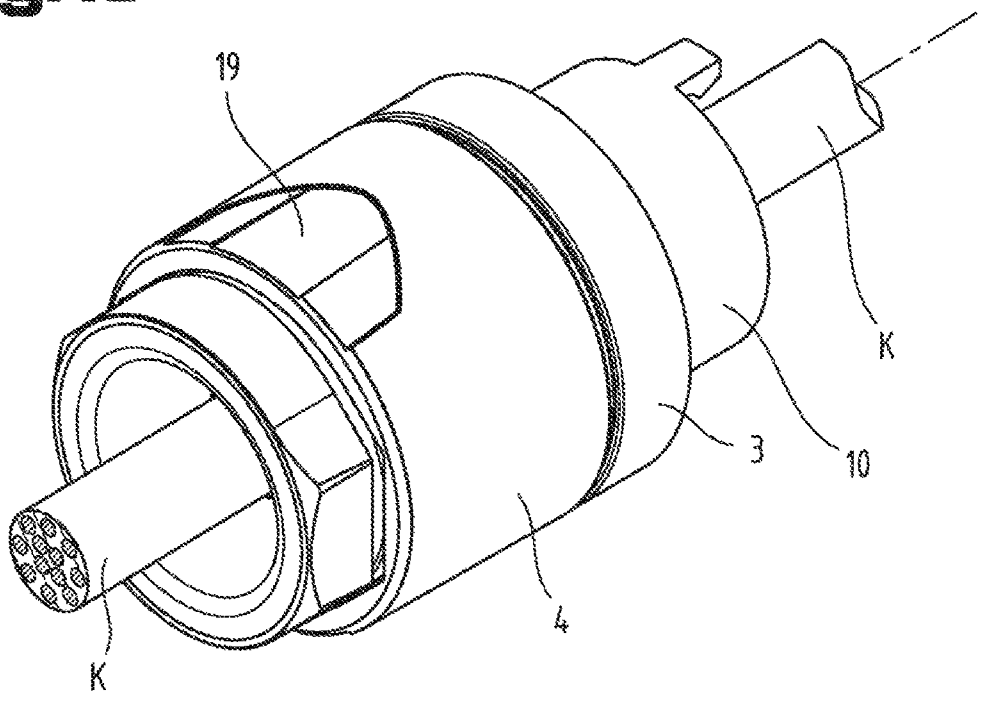
FIG. 13 shows a perspective view of an arrangement according to the invention comprising the clamping member, clamping sleeve and tightening sleeve, in the state thereof prior to use with a cable having the largest possible cable diameter.

In FIG. 12 in a perspective view, an arrangement of the clamping member 12, clamping sleeve 4, tightening sleeve 4 and sealing collar 13 is illustrated in use with a cable K with a very large diameter. From the front, when viewed from the direction of the housing 1—not illustrated in this instance—the view of FIG. 13 is produced. It can be seen that the clamping tongues 12 of both groups 12*a*, 12*b* extend almost in alignment with the remaining portions of the clamping member 10 are compressed in a radially tapering manner only slightly in the direction toward the rear end of the clamping tongues 12 and are positioned flat on the cable K in order to clamp it as a result of the action of both groups 12*a* and 12*b*.

Figure 14:
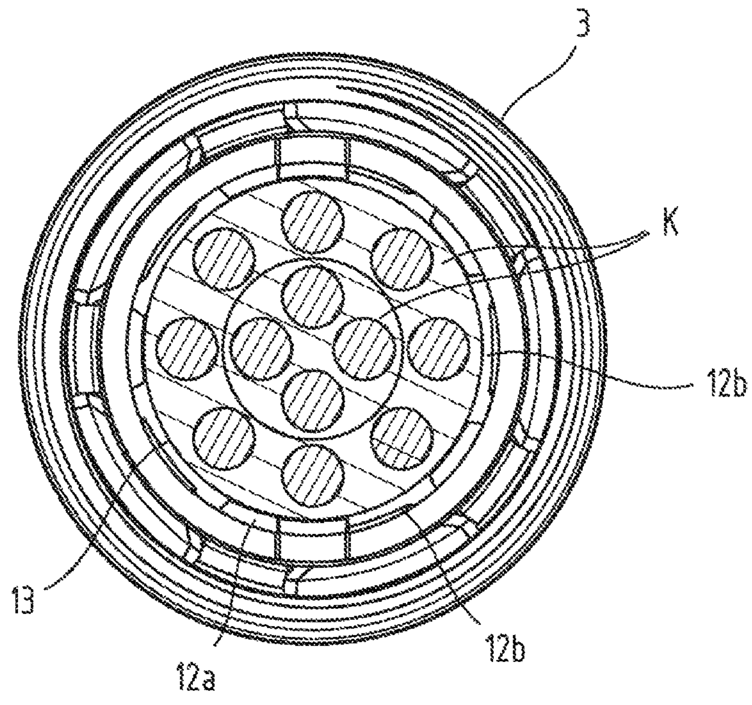
FIG. 14 shows a view of the arrangement of FIG. 12 from the front.

In contrast, FIG. 14 shows a view of the arrangement of FIG. 12 from the same direction as FIG. 13, but this time for a cable K with a very small diameter. In this instance, the clamping sleeve 3 can be screwed very far forward onto the housing 1 and presses the clamping tongues 12 radially inwardly. In this instance, the lateral edges of the clamping tongues 12 of different groups come to rest on each other and with continued radial pressing, when the threaded connection is tightened, the clamping tongues 12*b* of the second group are increasingly pressed inward and in the direction toward the cable K or into the cover of the cable K by the chamfered side faces of the clamping tongues 12*a* of the first group. The clamping of the cable K is in this instance primarily brought about by the clamping tongues 12*b* of the second group.

As can also be seen in FIGS. 13 and 14, in this instance the clear width, that is to say, the inner diameter of the clamping member 1 which is available for introducing the cable K, is only slightly smaller than the outer diameter of the clamping member 10 and also the housing 1 or the clamping sleeve 3, which can thus be configured to be very thin-walled and hardly significantly increase the diameter of the cable connector assembly. The clear width is in this instance continuous, but, particularly between the ends of the clamping tongues 12, between 70 and 80% of the diameter of the clamping member 10. Preferably, this value is between 75 and 95%. When the clamping sleeve 3 is screwed to the housing 1 of the cable connector assembly to the maximum extent, however, the clamping tongues 12 are in the maximum compressed state thereof, both in a circumferential direction and in a radial direction. The clamping tongues 12*a* of the first group 12 of clamping tongues 12 are located in this instance with the side edges on each other and press the clamping tongues 12*b* of the second group inward to the maximum extent. In this instance, between the clamping tongues 12, in particular between the clamping tongues 12*b* of the second group, the smallest possible clear width is produced, wherein the diameter for introducing the cable K through the clamping member 10 is between 20 and 40% of the diameter of the clamping member. Preferably, this value is between 10 and 30%. With regard to the housing 1 or the clamping sleeve 3, the maximum values or minimum values for the clear width are 60 and 80% of the diameter thereof or 5 and 20% of the diameter thereof.

Figure 15:
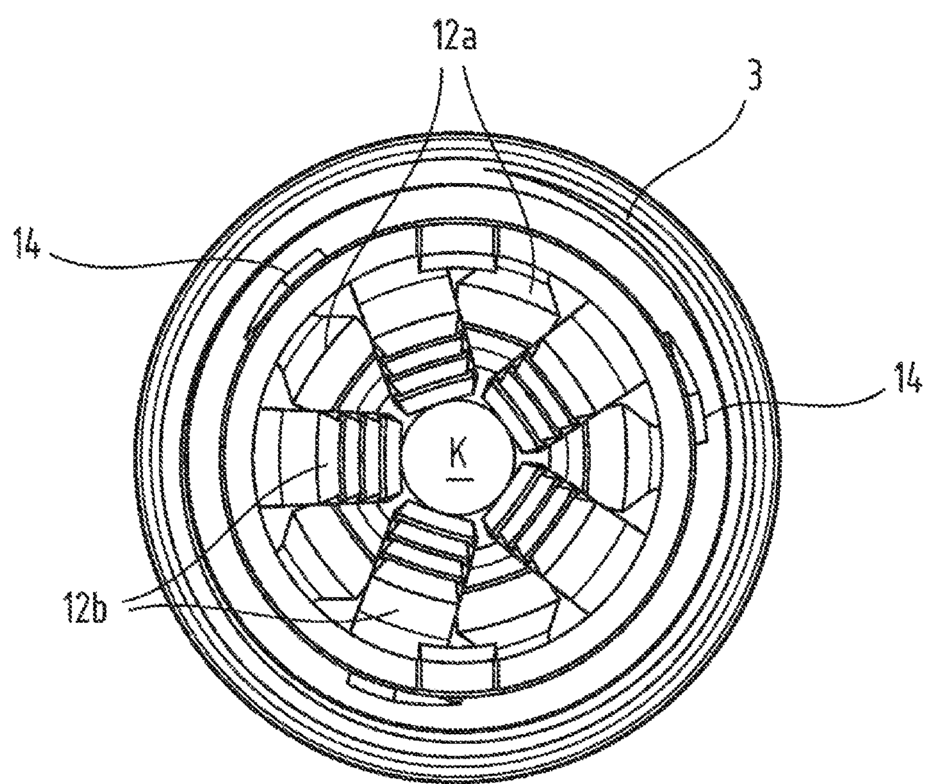
FIG. 15 shows a view of the arrangement according to FIG. 12 from the front, in its state for use with the smallest possible cable diameter.
Figure 16:
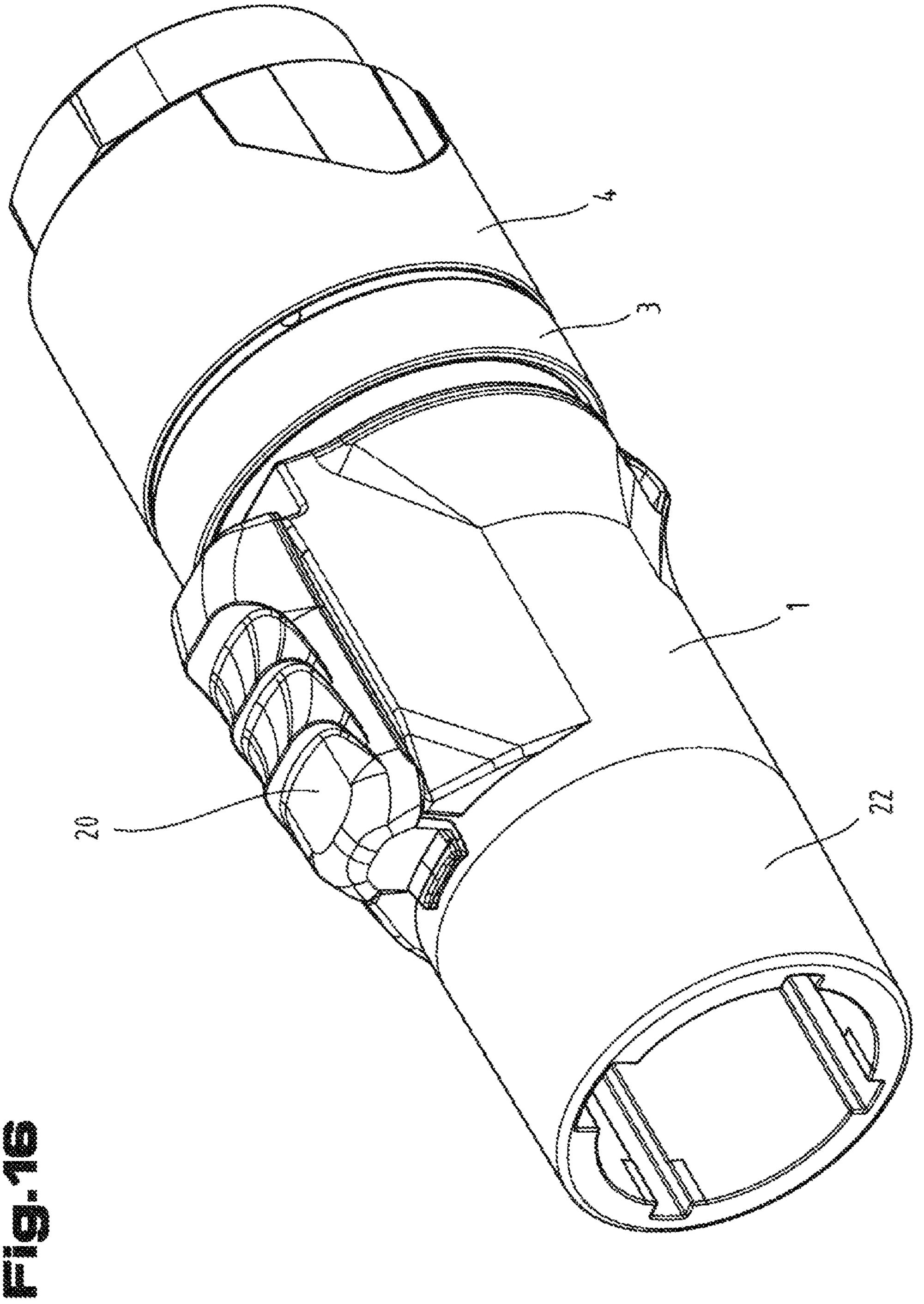
FIG. 16 shows a perspective view of another embodiment of a cable connector assembly according to the invention.

FIG. 15 shows another embodiment of the cable connector assembly according to the invention, wherein again, for identical components, the same reference numerals or component names as in the previous Figures are used. In place of a plug continuation 2, the housing 1 now has a preferably integrally formed-on insertion continuation 22. Apart from this difference, the structure and the function are identical as previously explained in connection with FIGS. 1 to 14. The housing 1 and plug continuation 2 or insertion continuation 22 may also vary depending on the connector type in order to cover all conventional plug connectors and contact types, of XLR connectors, data connectors, for example, of the RJ45 type, over all possible standard or proprietary types.

Figure 17:
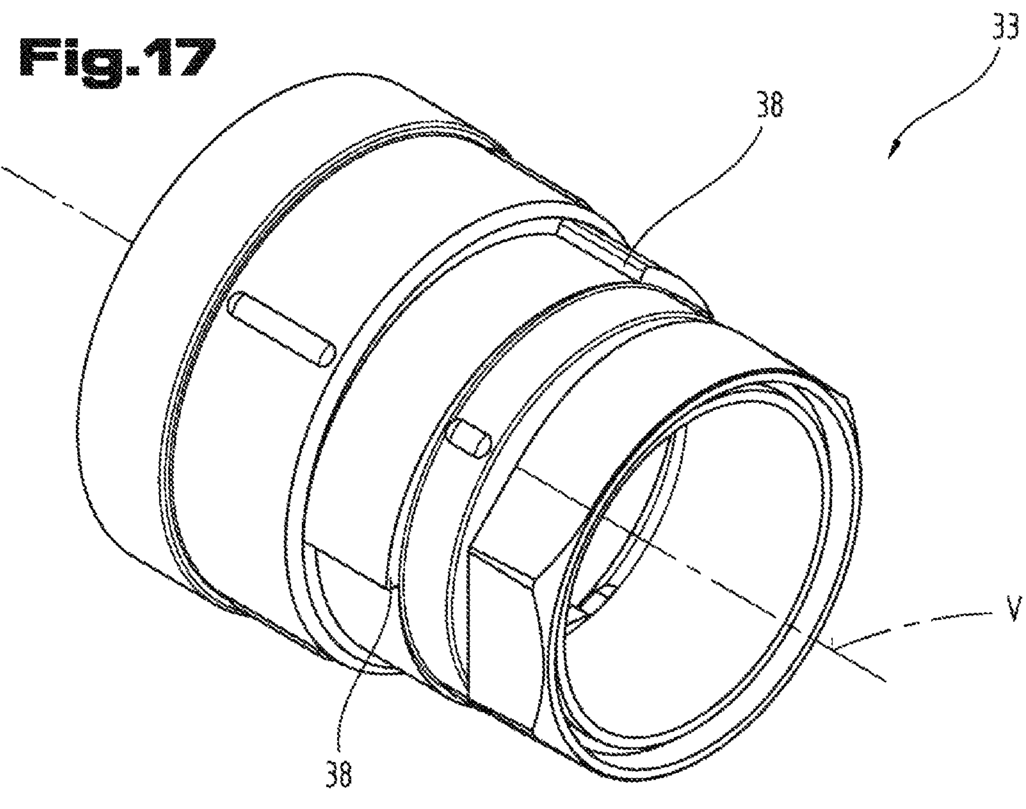
FIG. 17 shows a perspective view of a clamping sleeve of another embodiment of the invention.
Figure 18:
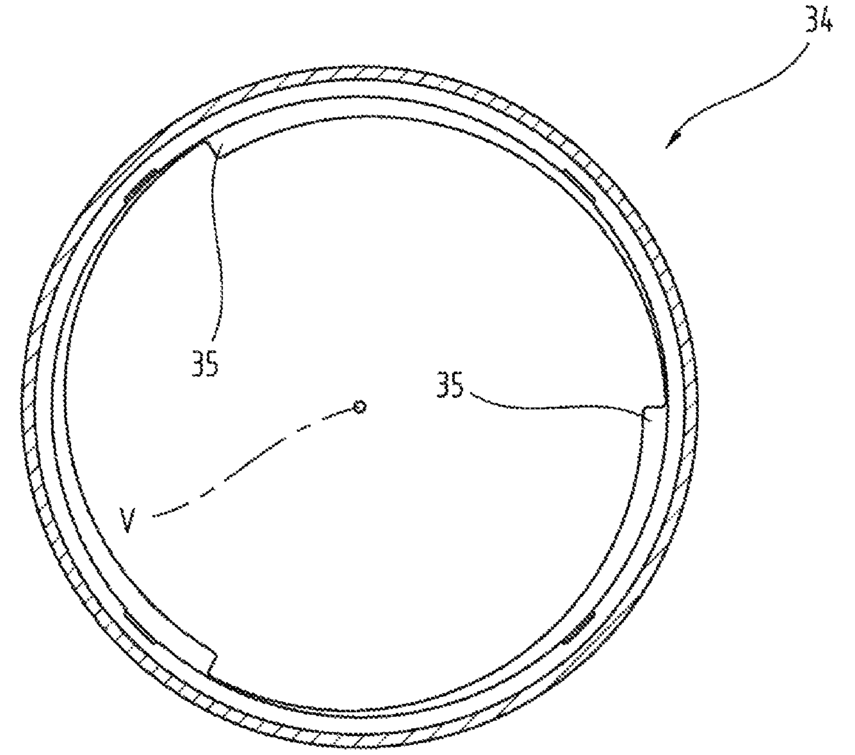
FIG. 18 shows a cross section through a tightening sleeve for the clamping sleeve of FIG. 17.

Whilst the embodiment of the invention as described above and as illustrated in FIGS. 1 to 15 makes provision for the height of the slotted member 15 and the locking pawl 18 to change in a direction parallel with the rotation axis of the clamping sleeve 3 and tightening sleeve 4, other configurations are also possible. Thus, FIG. 17 shows an embodiment in which a slotted member 35 is formed on the inner side of a tightening sleeve 34, the height of which changes in a radial direction toward the axis V of the relative rotation of this tightening sleeve 34 and a complementary clamping sleeve 33. In this instance, on this latter clamping sleeve 33, there are arranged on the outer side thereof locking pawls 38, as can be seen in FIG. 18, which also have a height which changes in a radial direction with respect to the axis V. These slotted members 35 and locking pawls 38 come in the same manner into engagement or can slide on each other with little radial bulging of the tightening sleeve 34 as explained for the above-described radially vertically adjustable slotted member/locking pawl system.

In addition to the above-explained embodiments with fixed structures for the locking mechanism, constructions are also conceivable in which the clamping sleeve 3 itself is not acted on with a tool but instead in which using a tool at least one locking element between the clamping sleeve 3 and tightening sleeve 4 can be brought into a position which brings about a rotationally secure, at most temporary coupling between the clamping sleeve 3 and tightening sleeve 4. For example, by means of a pin or a screwdriver which can be introduced into a preferably axial opening of the cable connector assembly, an inner locking pin could be displaced or a locking pawl could be pivoted, which members connect the clamping sleeve 3 and the tightening sleeve 4 in a rotationally secure manner.

The exemplary embodiments show possible variants, wherein it should be noted at this point that the invention is not limited to the specifically illustrated variants thereof, but instead various combinations of the individual variants with each other are also possible and these possible variations, as a result of the teaching relating to technical activity by the present invention, are within the capability of the person skilled in the art active in this technical field.

The protective scope is determined by the claims. The description and the drawings should, however, be referred to in order to interpret the claims. Individual features or feature combinations from the various exemplary embodiments shown and described may constitute independent solutions which are inventive per se. The objective on which the independent inventive solutions are based can be derived from the description.

All the indications relating to value ranges in the present description are intended to be understood so that they include any and all part-ranges therein, for example, the indication 1 to 10 is intended to be understood such that all part-ranges, starting from the lower limit 1 and the upper limit 10, are also included, that is to say, all the part-ranges begin with a lower limit of 1 or more and end with an upper limit of 10 or less, for example, 1 to 1.7, or 3.2 to 8.1 or 5.5 to 10.

For the sake of order, it should finally be mentioned that, for better understanding of the structure, elements have been partially illustrated in a state not true to scale and/or to an enlarged and/or reduced scale.

LIST OF REFERENCE NUMERALS

1 Housing
2 Connector continuation
3 Clamping sleeve
4 Tightening sleeve
5 Outer thread
6 Inner thread
7 Sealing ring
8 Resilient element
9 Guide web
10 Clamping member
11 Front edge
12 Clamping tongue
**12*a*** First clamping tongue
**12*b*** Second clamping tongue
13 Sealing collar
14 Locking pawl
15 Slotted member
**15*a*** Flat flank
**15*b*** Steep flank
16 Projection
**16*a*** Stop
17 Carrier locations
18 Locking pawl
19 Gripping face
20 Unlocking slotted member
21 Protuberance
22 Insertion continuation
A Longitudinal center axis
O Rear opening
U Envelope

The invention claimed is:

1. A cable connector assembly for electrical and/or optical cables and for connection to a complementary connector assembly, the cable connector assembly comprising:

a) a housing for receiving the contact elements for electrical and/or optical contacting of the complementary connector assembly, having a thread which is arranged on a rear edge;

b) a clamping member, which is at least partially radially compressible and which engages round the cable and clamps the cable in a compressed state;

c) a clamping sleeve having a thread which is arranged on a front edge in order to form a threaded connection with the thread on the housing, wherein, when the threaded connection is tightened, the clamping sleeve, the clamping member, the housing and the cable are clamped together and at least one of i) the cable (K) is positioned in a rotationally secure manner with respect to the clamping member or ii) the clamping member is positioned in a rotationally secure manner with respect to the housing;

d) a tightening sleeve, a length of which is smaller than a length of the clamping sleeve and which is pushed coaxially over at least a part-portion of the clamping sleeve; and e) a unidirectional locking mechanism at least between the clamping sleeve and the tightening sleeve, which prevents a relative rotation of the tightening sleeve and the clamping sleeve in a tightening direction of the threaded connection between the clamping sleeve and the housing beyond a specific degree.

2. The cable connector assembly as claimed in claim 1, wherein the unidirectional locking mechanism is a dimensionally accurate locking mechanism or a toothed locking mechanism between the clamping sleeve and the tightening sleeve, and on either the tightening sleeve or the clamping sleeve a slotted member is formed having at least one long, flat flank and at least one steep flank which faces in an opening direction of the threaded connection between the clamping sleeve and housing and on the other of the tightening sleeve or the clamping sleeve, a locking pawl having a substantially complementary shape is formed.

3. The cable connector assembly as claimed in claim 2, wherein a height of the slotted member and the locking pawl change in a direction parallel with a rotation axis of the clamping sleeve and the tightening sleeve.

4. The cable connector assembly as claimed in claim 2, wherein a length of the locking pawl is only a fraction of a length of the slotted member.

5. The cable connector assembly as claimed in claim 2, wherein the slotted member is formed on the clamping sleeve and the locking pawl is formed on the tightening sleeve.

6. The cable connector assembly as claimed in claim 1, wherein a rear edge of the clamping sleeve opposite the thread protrudes beyond a rear edge of the tightening sleeve and has carrier locations for a tool in order to apply a torque to the clamping sleeve.

7. The cable connector assembly as claimed in claim 6, wherein the carrier locations are formed by at least a pair of planar faces which are arranged parallel with each other and opposite each other with respect to a longitudinal center axis of the clamping sleeve.

8. The cable connector assembly as claimed in claim 7, wherein a width of the planar faces in a direction of the longitudinal center axis is between 1 mm and 10 mm.

9. The cable connector assembly as claimed in claim 6, further comprising a stop which limits the displaceability of the tightening sleeve with respect to the rear edge of the clamping sleeve.

10. The cable connector assembly as claimed in claim 9, wherein the stop comprises a projection which extends at least over a portion of a circumference of the rear edge of the clamping sleeve, and a radial extent of the projection is greater than an inner diameter of a rear opening of the tightening sleeve.

11. The cable connector assembly as claimed in claim 1, further comprising at least one projection that bridges at least a majority of an intermediate space between the clamping sleeve and the tightening sleeve.

12. The cable connector assembly as claimed in claim 1, further comprising a unidirectional locking mechanism between the clamping sleeve and the clamping member, which prevents a relative rotation of the clamping sleeve and the clamping member in an opening direction of the threaded connection between the clamping sleeve and the housing.

13. The cable connector assembly as claimed in claim 12, wherein the unidirectional locking mechanism comprises a dimensionally accurate locking mechanism or a toothed locking mechanism between the clamping sleeve and the clamping member, and either the clamping member or the clamping sleeve includes at least one catch and the other of the clamping member or the clamping sleeve includes at least one locking pawl.

14. The cable connector assembly as claimed in claim 13, wherein the at least one pawl includes a plurality of saw-tooth-shaped locking pawls which are distributed in a uniform manner over a circumference and which have short flanks which face in the opening direction of the threaded connection between the clamping sleeve and housing.

15. The cable connector assembly as claimed in claim 1, wherein clear width of at least one of the housing or the clamping sleeve is at maximum values of 60 and 80% of a diameter thereof or at a minimum value of 5 and 20% of the diameter thereof.

16. The cable connector assembly as claimed in claim 1, further comprising the clamping member for clamping the cable in the cable connector assembly, includes at least one portion which is radially compressible and which engages round the cable and which clamps the cable in the compressed state, a front edge region for abutting the housing of the cable connector assembly and/or a connector continuation which is inserted therein, and a rear portion which is formed by a number of clamping tongues which are distributed along a circumference thereof and which are resiliently compressed in a radial direction, wherein there are at least two different types of the clamping tongues.

17. The cable connector assembly as claimed in claim 16, wherein each said clamping tongue of a first group of the clamping tongues is wider than each said clamping tongue of a second group.

18. The cable connector assembly as claimed in claim 17, wherein the clamping tongues of the first group widen with increasing spacing from the front edge region of the clamping member and are chamfered at side edges thereof.

19. The cable connector assembly as claimed in claim 18, wherein the clamping tongues of the first group have at the end thereof a portion which is constructed to apply a clamping action to a cable for positive-locking introduction into a cover of the cable.

20. The cable connector assembly as claimed in claim 17, wherein the clamping tongues of the second group of the clamping tongues are configured to be slightly narrower the clamping tongues of the first group.

21. The cable connector assembly as claimed in claim 20, wherein side edges of the clamping tongues of the second group extend parallel with each other over an entire length of the clamping tongues of the second group.

22. The cable connector assembly as claimed in claim 21, wherein a region which is configured to increase a retention action on the cable extends from an outer end of the clamping tongues (12*b*) of the second group almost to an inner end thereof.

23. The cable connector assembly as claimed in claim 17 wherein for the clamping tongues which extend in alignment with the front edge region, a clear width between the ends of the clamping tongues is between 70 and 95% of a diameter of the clamping member and, for the clamping tongues which are compressed to a maximum extent, such that the clamping tongues of the first group abut each other, a clear width between the ends of the clamping tongues is between 10 and 40% of the diameter of the clamping member.

* * * * *